(12) United States Patent
Krebs et al.

(10) Patent No.: US 11,977,860 B1
(45) Date of Patent: *May 7, 2024

(54) SYSTEMS AND METHODS FOR ANALYZING ROBOTIC PROCESS AUTOMATION CODE

(71) Applicant: UNITED SERVICES AUTOMOBILE ASSOCIATION (USAA), San Antonio, TX (US)

(72) Inventors: Emily Kathleen Krebs, San Antonio, TX (US); Jonathan Aguirre, San Antonio, TX (US); Brian Scott Funderburk, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,419

(22) Filed: Jun. 20, 2022

Related U.S. Application Data

(63) Continuation of application No. 17/066,146, filed on Oct. 8, 2020, now Pat. No. 11,366,644.

(60) Provisional application No. 62/912,927, filed on Oct. 9, 2019.

(51) Int. Cl.
*G06F 8/34* (2018.01)
*G06F 8/41* (2018.01)
*G06F 9/451* (2018.01)

(52) U.S. Cl.
CPC .............. *G06F 8/34* (2013.01); *G06F 8/427* (2013.01); *G06F 9/451* (2018.02)

(58) Field of Classification Search
CPC ............. G06F 8/34; G06F 8/427; G06F 9/451
USPC ................................ 717/107–121; 706/45–50
See application file for complete search history.

(56) References Cited

U.S. PATENT DOCUMENTS

| | | | | |
|---|---|---|---|---|
| 5,983,020 | A * | 11/1999 | Sweeney | G06F 8/72 707/999.1 |
| 6,292,715 | B1 * | 9/2001 | Rongo | B25J 9/1671 700/165 |
| 7,146,347 | B1 | 12/2006 | Vazquez et al. | |
| 7,324,982 | B2 | 1/2008 | Loh et al. | |
| 7,440,932 | B2 | 10/2008 | Gartland et al. | |
| 7,454,399 | B2 * | 11/2008 | Matichuk | G06F 9/45512 706/14 |
| 7,895,140 | B2 | 2/2011 | Nagashima | |
| 8,171,406 | B1 * | 5/2012 | Newstadt | G06F 9/451 715/764 |
| 8,600,924 | B2 * | 12/2013 | Otto | G06Q 30/0224 706/47 |
| 9,817,967 | B1 | 11/2017 | Shukla et al. | |

(Continued)

OTHER PUBLICATIONS

Kedziora et al, Turning Robotic Process Automation onto Intelligent Automation with Machine Learning, ACM, pp. 1-5 (Year: 2023).*

(Continued)

*Primary Examiner* — Anil Khatri
(74) *Attorney, Agent, or Firm* — Fletcher Yoder, P.C.

(57) ABSTRACT

Systems and methods for analyzing Robotic Process Automation (RPA) code are provided. A robotic process automation (RPA) file is received. RPA data within the RPA file is parsed and restructured for rendering in a code-review graphical user interface (GUI). A code-review GUI with the restructured RPA data is then rendered.

18 Claims, 14 Drawing Sheets

(56) References Cited

U.S. PATENT DOCUMENTS

| | | | |
|---|---|---|---|
| 9,910,761 B1 | | 3/2018 | Jules et al. |
| 10,120,656 B1 * | | 11/2018 | Singh .................. G06F 11/3616 |
| 10,261,658 B2 * | | 4/2019 | Zhang .................. G06F 3/0481 |
| 10,311,360 B1 | | 6/2019 | Ares |
| 10,324,457 B2 * | | 6/2019 | Neelakandan ... G05B 19/41865 |
| 10,449,670 B2 | | 10/2019 | Mummigatti et al. |
| 10,691,113 B1 | | 6/2020 | Bergman |
| 10,802,889 B1 | | 10/2020 | Ganesan et al. |
| 10,839,404 B2 | | 11/2020 | Ramamurthy et al. |
| 10,860,295 B1 | | 12/2020 | Ketireddy et al. |
| 10,885,423 B1 | | 1/2021 | Voicu et al. |
| 10,977,166 B1 | | 4/2021 | Jaganmohan et al. |
| 11,086,751 B2 | | 8/2021 | Moresmau et al. |
| 11,366,644 B1 * | | 6/2022 | Krebs ..................... G06F 9/451 |
| 11,373,131 B1 * | | 6/2022 | Venugopal ....... G06Q 10/06395 |
| 11,440,201 B2 * | | 9/2022 | Singh ....................... G06N 3/04 |

OTHER PUBLICATIONS

Li et al, "Modeling Contact State of Industrial Robotic Assembly using Support Vector Regression", IEEE, pp. 646-651 (Year: 2018).*

Yatskiv et al, "Improved Method of Software Automation Testing Based on the Robotic Process Automation Technology", IEEE, pp. 293-296 (Year: 2019).*

Falih et al, "Robotic Process Automation in Smart System Platform: A Review", IEEE, pp. 1-5 (Year: 2022).*

Gotzen et al, "Classification of software-based automation technologies Derivation of characteristics through an empirical investigation", IEEE, pp. 1-9 (Year: 2021).*

Chacon-Montero et al, "Towards a Method for Automated Testing in Robotic Process Automation Projects", IEEE, pp. 42-47 (Year: 2019).*

Noel et al, "Computational SRAM Design Automation Using Pushed Rule Bitcell for Energy Vector Processing", ACM, pp. 1187-1192 (Year: 2020).

Lee et al, "Towards Incremental Learning of Task-dependent Action Sequences using Probabilistic Parsing", IEEE, pp. 1-6 (Year:2011).

Sun et al, "8otSeer: An automated information system for analyzing Web robots", IEEE, pp. 108-114 (Year: 2008).

Dantam et al, "The Motion Grammar: Analysis of a Linguistic Method for Robot Control", IEEE, pp. 704-718 (Year: 2013).

Baidya, "Document Analysis and Classification: A Robotic Process Automation (RPA) and Machine Learning Approach", IEEE, pp. 33-37 (Year: 2021).

Ketkar et al, "Effectiveness of Robotic Process Automation for data mining using UiPath", IEEE, pp. 864-867 (Year: 2021).

Nadine et al, "Using machine learning for cognitive Robotic Process Automation (RPA)", IEEE, pp. 1-6 (Year: 2020).

* cited by examiner

COMMANDS

- ☐ VARIABLES
- ☐ MESSAGE / PROMPT BOXES
- ☐ DISABLE CODE
- △ OBJECT CLONING
- ☑ LOGS
- ☐ COMMENTS
- ☐ SCRIPTS / MACROS
- ☑ SCREEN CAPTURES
- ○ RUN TASKS
- △ ERROR HANDLING
- ☐ OPEN / CLOSE APPS
- ⌇ ENCRYPT / DECRYPT
- ☑ SOAP / REST
- ☐ CONNECT / DISCONNECT
- ⌇ METABOTS

[ SCANNED | PASS/FAIL | v10 | v11 ]    [ BROWSE ] [ CONVERT ] [ SCAN ] [ EXPORT ]

—Email Read—

| NAME | TYPE | VALUE |
|---|---|---|
| $Prompt-Assignment$ | VALUE | Test-Value |
| $my-list-variable$ | LIST | my-value-1 my-value-2 my-value-3 my-value-4 my-value-5 |
| $PolicyNumber$ | ARRAY | |
| $PNumber$ | ARRAY | |
| $MyArray$ | ARRAY | |
| $strActualDay$ | VALUE | |
| $arJointhePolicyNumber$ | ARRAY | |
| $strSetCellValue$ | VALUE | 3 |
| $strArrayLength$ | VALUE | - - |
| $intEmailListCounter$ | VALUE | 1 |
| $arNCEmailsList$ | ARRAY | |
| $intPolicyCounter$ | VALUE | 1 |
| $number$ | VALUE | 2 |
| $intCounterforExactValues$ | VALUE | 1 |
| $intArrayCounter$ | VALUE | 2 |
| $intEmailListLength$ | VALUE | |

| COMMANDS | SCANNED | PASS/FAIL | v10 | v11 | BROWSE | CONVERT | SCAN | EXPORT |
|---|---|---|---|---|---|---|---|---|
| ☐ VARIABLES | | | | | | | | |
| ☐ MESSAGE/PROMPT BOXES | —Email Read— | | | | | | | |
| ☐ DISABLE CODE | COMMAND TYPE | | | VALUE | | | | |
| ◇ OBJECT CLONING | | | | | | | | |
| ☑ LOGS | —Cleanuptask— | | | | | | | |
| ☐ COMMENTS | COMMAND TYPE | | | VALUE | | | | |
| ☐ SCRIPTS/MACROS | Close | | | Excel: Close Spreadsheet Session: Default | | | | |
| ☑ SCREEN CAPTURES | WndClose | | | Close Window: "Portal-Internet Explorer" | | | | |
| ○ RUN TASKS | WndClose | | | Close Window:"http://ww4int.usaa.com/inct/pc_apps_/CIPolicyLossServlet?member_number_tdf" | | | | |
| △ ERROR HANDLING | | | | | | | | |
| ⊞ OPEN/CLOSE APPS | | | | | | | | |
| ⚿ ENCRYPT/DECRYPT | | | | | | | | |
| ☰ SOAP/REST | | | | | | | | |
| ☐ CONNECT/DISCONNECT | | | | | | | | |
| ⚙ METABOTS | | | | | | | | |

FIG. 12

| COMMANDS | | SCANNED | PASS/FAIL | v1.0 | v1.1 | BROWSE | CONVERT | SCAN | EXPORT |
|---|---|---|---|---|---|---|---|---|---|
| ☐ VARIABLES | | | | | | | | | |
| ☐ MESSAGE/PROMPT BOXES | | ——Email Read—— | | | | | | | |
| ☐ DISABLE CODE | | COMMAND TYPE | TAKE SNAPSHOT | RUN TASK | LOG TO FILE | SEND EMAIL | VARIABLE ASSIGNMENT | | |
| ◇ OBJECT CLONING | | ERROR/HANDLING | | | FILE PATH:$ENV_Errorlogfiles$ TextValue: "$Date* $System (USERNAME) $,$AATaskName$","$StartTime$","$EndTime$","$TaskStatus $","$ErrorLine Number$","$Error Description$","$System (SESSIONNAME)$","$System (COMPUTERNAME) $","(USERNAME)$","$System (SYSTEMNAME)$","$System (COMPUTERNAME)$" | | | | |
| ☑ LOGS | | | | | | | | | |
| ☐ COMMENTS | | | | | | | | | |
| ☐ SCRIPTS/MACROS | | | | | | | | | |
| ☐ SCREEN CAPTURES | | | | | | | | | |
| ○ RUN TASKS | | | | | | | | | |
| △ ERROR HANDLING ← 362 | | | | | | | | | |
| ☐ OPEN/CLOSE APPS | | ——Cleanuptask—— | | | | | | | |
| ⚙ ENCRYPT/DECRYPT | | COMMAND TYPE | TAKE SNAPSHOT | RUN TASK | LOG TO FILE | SEND EMAIL | VARIABLE ASSIGNMENT | | |
| ☐ SOAP/REST | | | | | | $ENV_toSupportemails | | | |
| ☐ CONNECT/DISCONNECT | | | | | | | | | |
| ⚙ METABOTS | | | | | | | | | |

360

COMMANDS

- ☐ VARIABLES
- ☑ MESSAGE / PROMPT BOXES
- ☐ DISABLE CODE
- ☐ OBJECT CLONING
- ☑ LOGS
- ☐ COMMENTS
- ☐ SCRIPTS / MACROS
- ☑ SCREEN CAPTURES
- ○ RUN TASKS
- △ ERROR HANDLING
- ☑ OPEN / CLOSE APPS
- ⚿ ENCRYPT / DECRYPT
- ☑ SOAP / REST
- ☐ CONNECT / DISCONNECT
- ☑ METABOTS

---

SCANNED | PASS/FAIL | v1.0 | v1.1 | 🗁 BROWSE | ⟳ CONVERT | 🔍 SCAN | ⎙ EXPORT

— HOO_ExtractionData — 380

| COMMAND TYPE | PROPERTIES | VALUE |
|---|---|---|
| OBJECT CLONING | Value:--<br>Window Title: Enterprise Work List-- Internet Explorer provided by USAA<br>HTML_ID: unavailstatusvo.status<br>HTML_Name: unavailstatusvo.status<br>HTML_ALT:--<br>HTML_Tag: SELECT<br>HTML_Class:--<br>HTML_Inner_Text: Production (Auto Get Next)<br>AwayBreakLunchPersonal<br>MiscMeeting / HuddleCoachingTrainingTechnical<br>ProblemsEmployee DevelopmentExeception Offline<br>ProductionSME SupportTask DeskGroup Email<br>TaskCoaching / Auditing(Sr use only) Log OffProduction (Work Offline)<br>HTML_SourceIndex: 102<br>HTML_HRef:--<br>HTML_Type: select-one<br>HTML_Value: PRODOFF<br>HTML_ClassId:--<br>HTML_Title:--<br>HTML_Height:21<br>HTML_Width:246<br>HTML_Tag_Index:1<br>HTML_Top:21<br>HTML_Left:612<br>HTML_HasFrame:True | Object Cloning: Select Item By Text "Production (Work Offline)" of ComboBox "unavailstatusvo.status" in window "Enterprise Work List" Source: Window, Play Type: Object |

FIG. 13

SYSTEMS AND METHODS FOR ANALYZING ROBOTIC PROCESS AUTOMATION CODE

CROSS-REFERENCE TO RELATED APPLICATION

The present disclosure is a continuation of U.S. patent application Ser. No. 17/066,146, titled "SYSTEMS AND METHODS FOR ANALYZING ROBOTIC PROCESS AUTOMATION CODE," which was filed on Oct. 8, 2020, claims priority to and the benefit of U.S. Provisional Patent Application Ser. No. 62/912,927, titled "SYSTEMS AND METHODS FOR ANALYZING ROBOTIC PROCESS AUTOMATION CODE," which was filed on Oct. 9, 2019, each of which is herein incorporated by reference in its entirety for all purposes.

BACKGROUND

The present disclosure relates generally to systems and methods for facilitating review of robotic process automation (RPA) code. In particular, the present techniques facilitate RPA code review for identifying compliance with coding standards and/or security vulnerabilities.

DRAWINGS

These and other features, aspects, and advantages of the present disclosure will become better understood when the following detailed description is read with reference to the accompanying drawings in which like characters represent like parts throughout the drawings, wherein.

Figure 14:
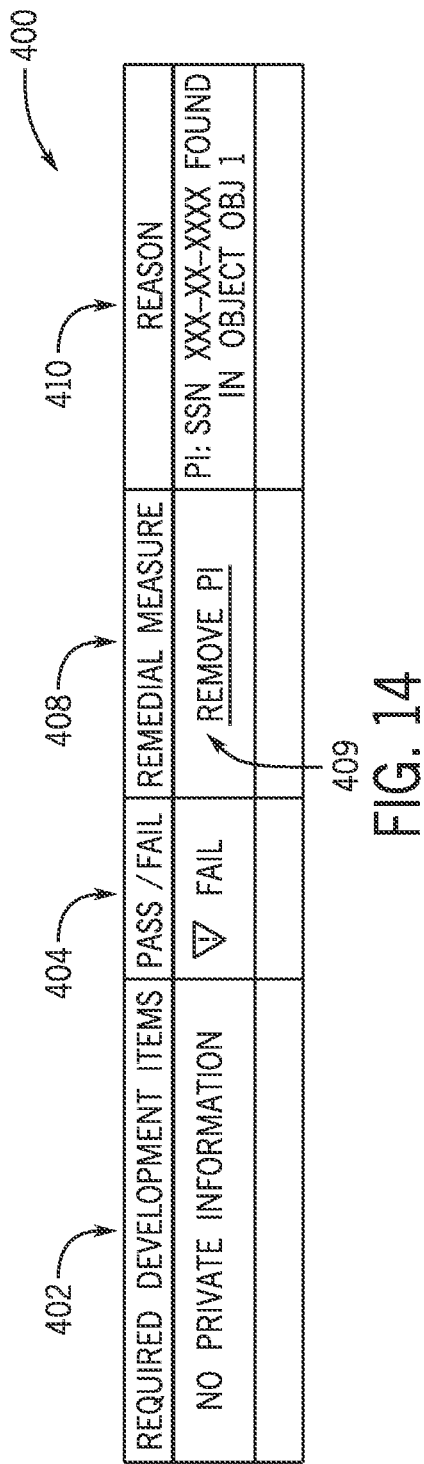
Figure 15:
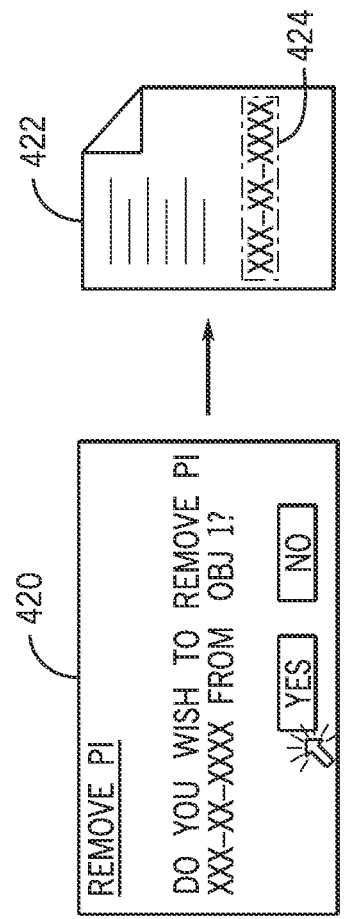

FIGS. 8-13 illustrate GUIs of an RPA scanner that may be used to facilitate code review of RPA code, in accordance with an embodiment; and FIG. 14 is a diagram, illustrating an example code review report that may be provided based upon the automated code review techniques described herein, in accordance with an embodiment of the current disclosure; and FIG. 15 is a diagram, illustrating an example code modification GUI that may be provided based upon the automated code review techniques described herein, in accordance with an embodiment of the current disclosure.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward systems and methods for facilitating review of robotic process automation (RPA) code. In particular, the present techniques facilitate RPA code review for identifying compliance with coding standards and/or security vulnerabilities.

RPA systems develop an action list by watching a user perform a task in an application's graphical user interface (GUI), and then perform the automation by repeating those tasks directly in the GUI. This can lower the barrier to use of automation, by providing an easy programming method to generate sophisticated code. Unfortunately, however, because much of this code is generated based upon monitoring user interaction with a GUI, unintended information or other unintended automatically generated code may be captured and added to the RPA code with little awareness from RPA developers. This unintended information and/or automatically generated code may contradict development standards of an organization and/or may introduce vulnerabilities into the RPA code.

To counteract this, the RPA code may be reviewed to determine whether the code complies with these development standards. Unfortunately, however, traditional code review of the RPA code is difficult and time consuming, as captured data used in the RPA code is structured in objects/commands that are manually opened in a GUI to review captured RPA code parameters. In some situations, pinpointing the data has typically required human subjectivity to identify the code standard violations.

Figure 1:
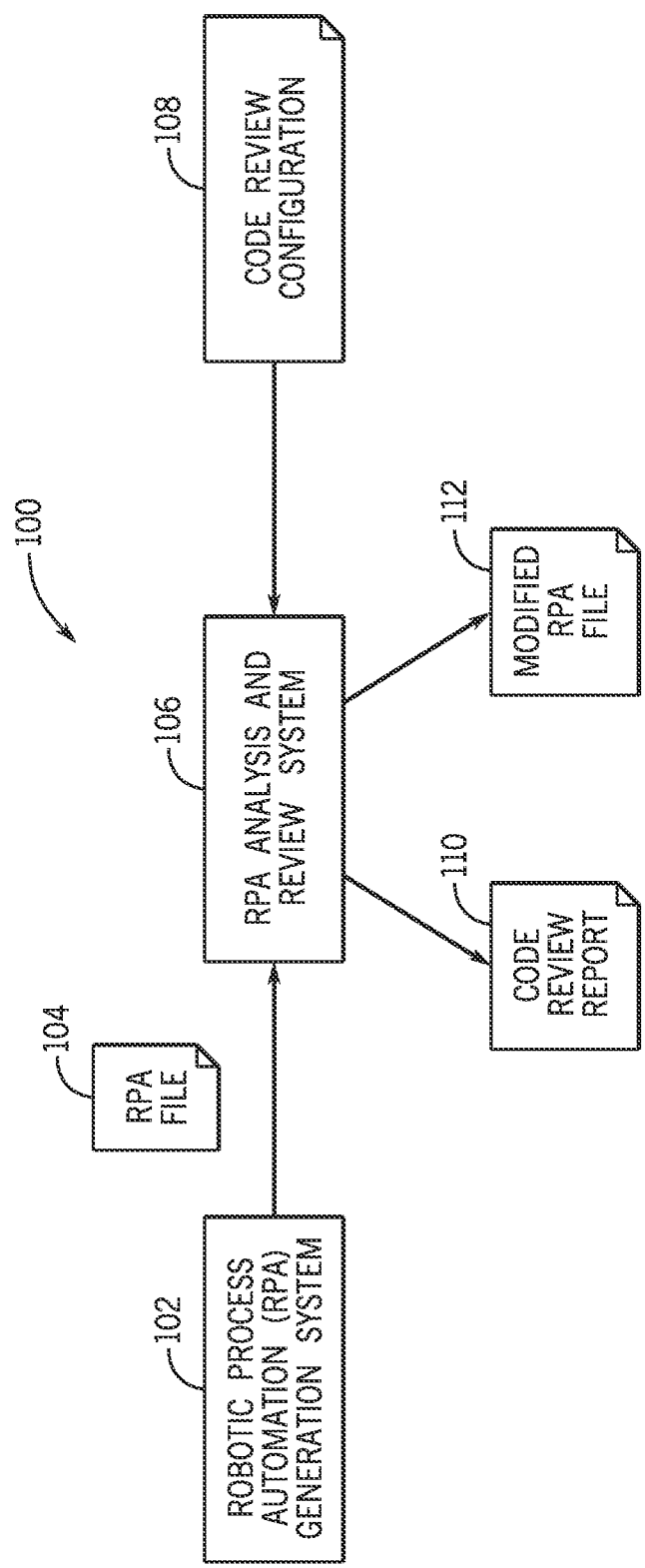
FIG. 1 is a block diagram, illustrating a system for implementing RPA code review, in accordance with an embodiment of the current disclosure.

Accordingly, techniques are provided herein to facilitate faster code review and/or provide automated RPA code modifications to comply with coding standards of an organization. FIG. 1 is a block diagram, illustrating a system 100 for implementing RPA code review, in accordance with an embodiment of the current disclosure.

The system 100 includes an RPA generation system 102. The RPA generation system 102 may be used to generate RPA code (e.g., RPA file 104) by monitoring user interaction within a GUI, as mentioned above.

The generated RPA code may not comply with development rules of an organization. This may provide undesirable traits in the RPA file 104. Accordingly, to mitigate, the RPA file 104 may be scanned via the RPA Analysis and Review System 106.

The RPA Analysis and Review System 106 may utilize a code review configuration 108, which defines particular development standards that should be adhered to by all of an organization's RPA files. For example, the code review configuration 108 may dictate that Exception Handling be in place for all or certain types of functionality, that logging be in place for certain functions, that private information not be stored in the code, that commented out code blocks not be present in the code, etc.

The RPA Analysis and Review System 106 may use to Code Review Configuration 108 to identify what to look for in the RPA file 104. For example, the RPA Analysis and Review System 106 may look only at code associated with items specified in the Code Review Configuration 108. The RPA Analysis and Review System 106 may use machine learning (ML) and/or other artificial intelligence features to identify whether the RPA code 104 conforms with the standards defined by the Code Review Configuration 108, as will be discussed in more detail below. In this manner, the RPA Analysis and Review System 106 may perform code review autonomously, without reliance on human subjectivity.

In some embodiments, a code review report 110 may be provided. In some embodiments, when manual code review should be completed, the code review report 110 may provide an indication of code to be reviewed by a developer. The format of the code review report 110 may facilitate review by the developer. For example, rather than providing a GUI with an object/command structure that requires opening and closing of object/commands code structures to look inside and verify object/command contents, the code review report 110 may provide a table format that makes viewing contents of the RPA code 104 easily visible without requiring opening and closing of objects/commands through numerous dialog boxes and/or code structures. Examples of this type of format may be found in FIGS. 10-13.

In some embodiments, when the RPA Analysis and Review System 106 performs an automated analysis of whether the RPA code 104 conforms with the standards defined in the code review configuration 108, the code review report 110 may include an indication of whether the RPA code 104 conforms with the standard. The code review report 110 may provide an indication of particular portions of the standard that the RPA does not conform to, along with particular portions of the code violating the standard. Further, in some embodiments, further mitigation tasks may be provided. For example, in some instances, the RPA Analysis and Review System 106 may provide a link for automatic mitigation of the offending code (e.g., by removal of at least a portion of the current RPA code 104). An example of this is illustrated in FIG. 14.

In some instances, the RPA Analysis and Review System 106 may automatically generate a modified RPA file 112 (e.g., RPA code) that is a version of the RPA code 104 that conforms with the standard defined by the code review configuration 108. The RPA Analysis and Review System 106 can generate this modified RPA file 112 by removing data (e.g., private information), inserting data (e.g., default error handling), etc. into the original RPA code 104. In some embodiments, prior to modifying the RPA code 104, a GUI may be provided to prompt for developer approval. Only upon approval from the developer, is the modification to the RPA code 104 made. An example of this is illustrated in FIG. 15.

Figure 2:
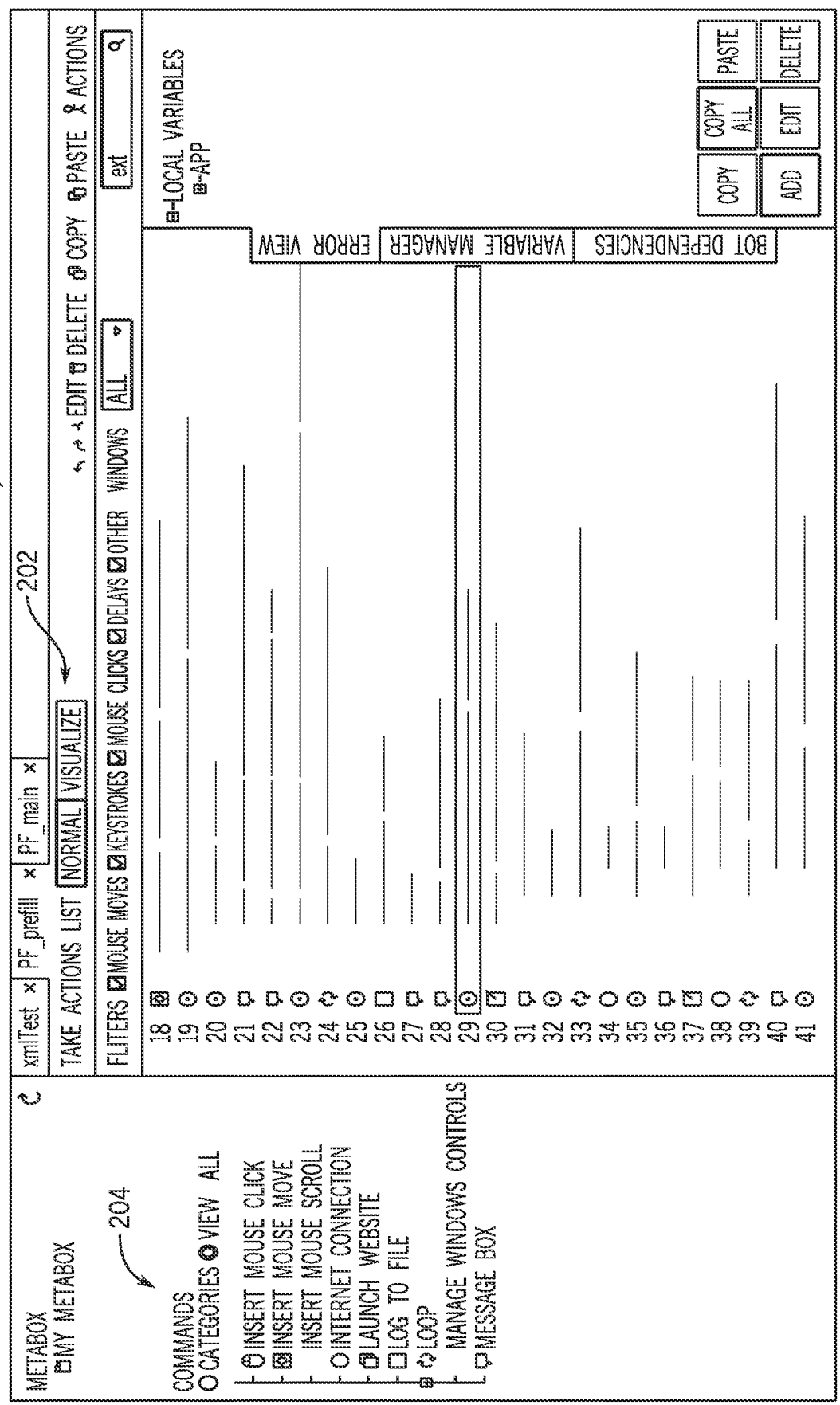
FIG. 2 is a block diagram, illustrating an RPA generation graphical user interface (GUI) that may be used to create and/or generate RPA code.

Turning now to illustrations of the system 100, FIG. 2 is a block diagram, illustrating an RPA generation graphical user interface (GUI) 200 that may be used to create and/or generate RPA code. A task action list 202 is provided that includes lines of objects/commands of the RPA code. In some instances additional code, such as conditional statements, etc. can be implemented around the objects/commands to facilitate a more dynamic coding. A list of commands 104 is provided in a side panel as well. The list of commands 104 may provide a listing of all objects/commands that may be selected for insertion into the RPA code and may also, in some embodiments, provide a categorized list of the objects/commands. As objects/commands are inserted, a local variables list 206 may provide a listing of variables associated with the objects/commands.

While the objects/commands may be seen in the lists 202 and 204, the underlying parameters of the objects/commands may be hidden in the GUI 200. For example, variables associated with the coded objects/commands may not be visible in this screen. Instead, as illustrated in FIGS. 3-6, in some instances these underlying parameters may be seen by navigating through the local variables list 206 and/or the task action list 202 and opening dialog boxes associated with the object/task to see corresponding details that should be reviewed.

Figure 3:
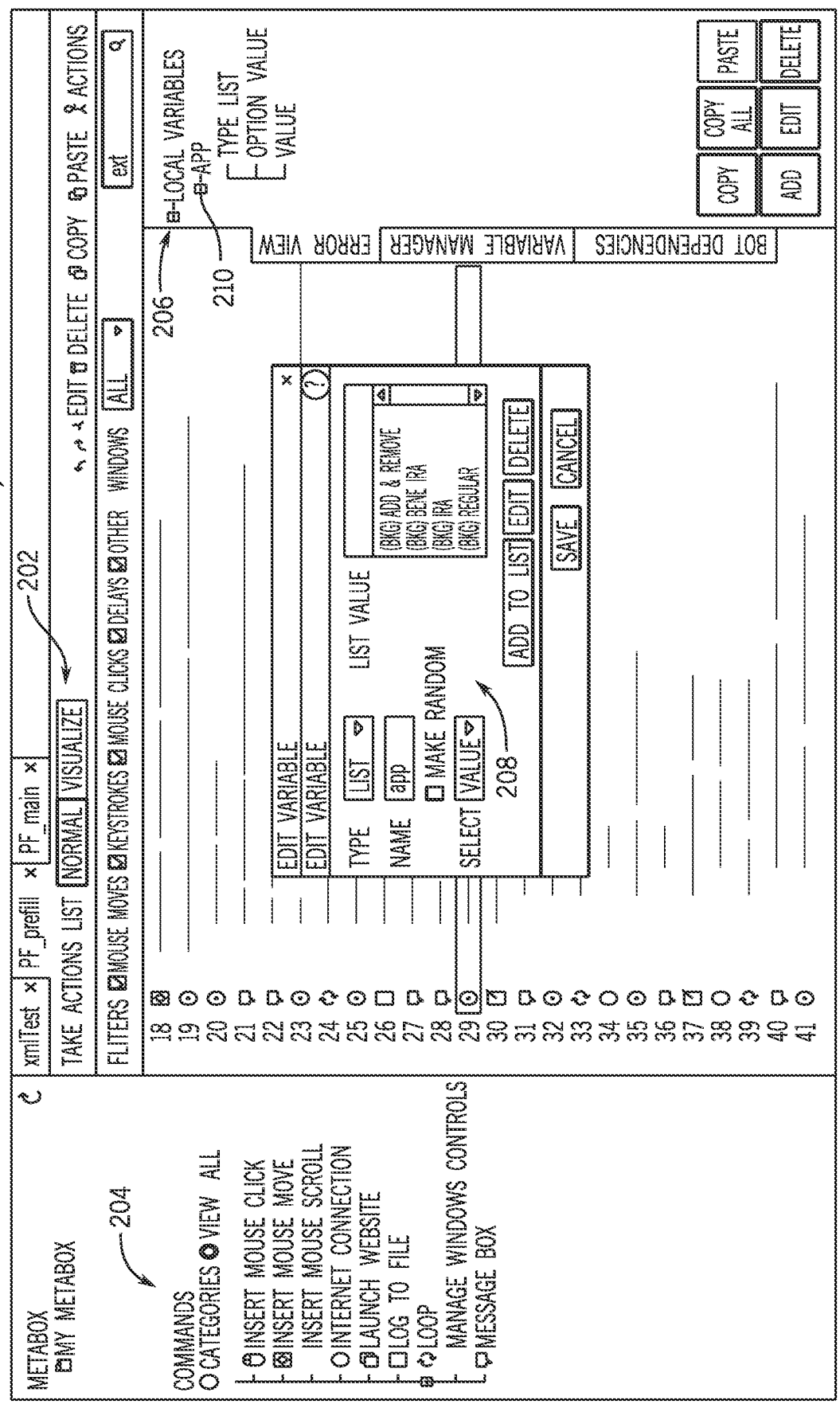
FIGS. 3-6 are diagrams, illustrating GUI dialog boxes for inputting RPA parameters and/or verifying code standard compliance, in accordance with an embodiment.

In FIG. 3, a dialog box 208 illustrating details of a variable for a variable 210 of the local variables list 206. Unfortunately, the underlying values may be difficult to review using this process, because each variable may need to be reviewed by manually clicking through each variable in the local variables list 206 and then opening up a corresponding dialog box to identify and review relevant information (e.g., variable values, etc.).

Figure 4:
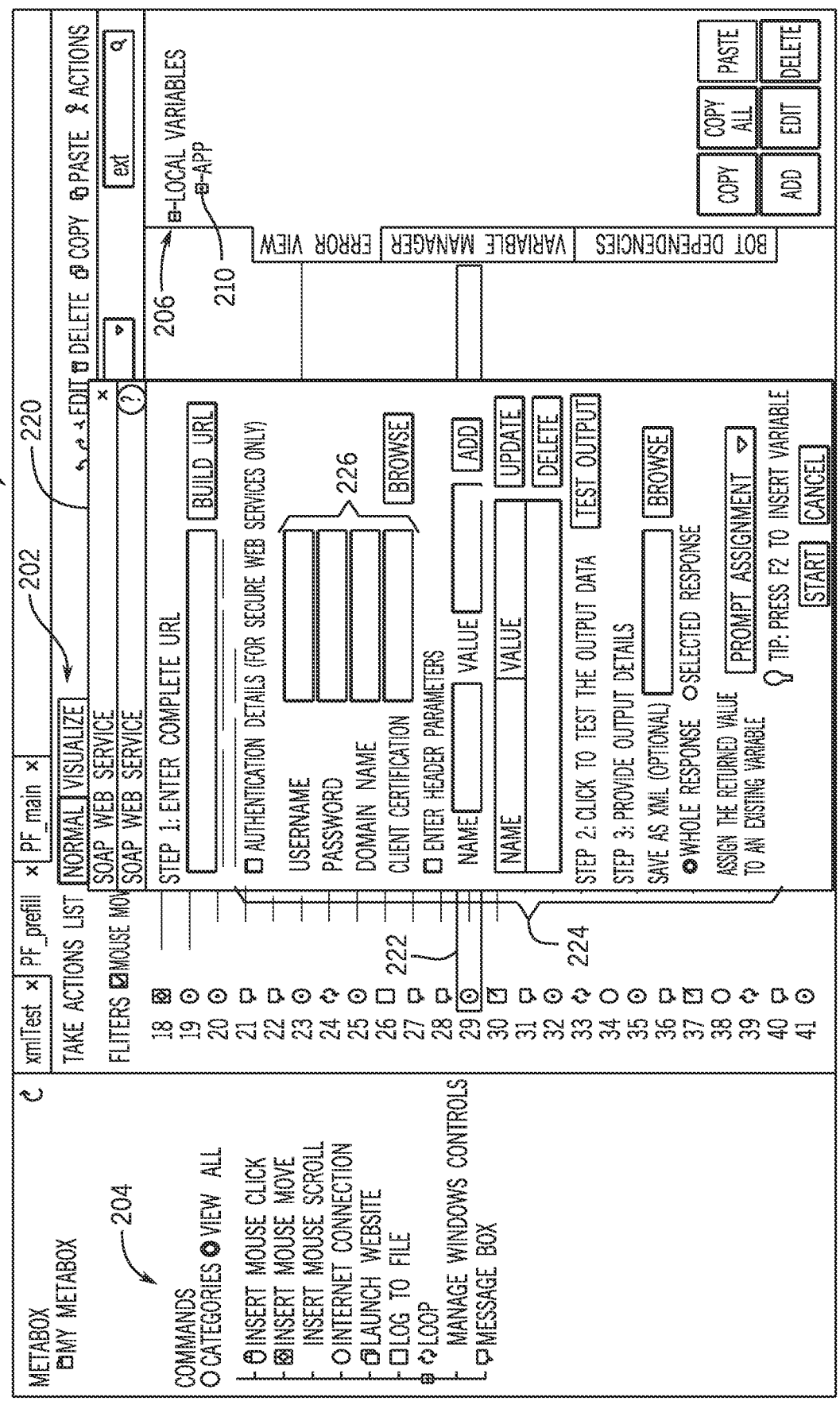

FIG. 4 illustrates a dialog box 220 associated with a command 222 selected from the task actions list 202. As illustrated, many of the attributes 224, such as credential information 226 may be observed by opening up the dialog box 220, corresponding to the command 222. Unfortunately, however, this is a tedious process, as a dialog box corresponding to each command may be opened to review attributes of each command.

Figure 5:
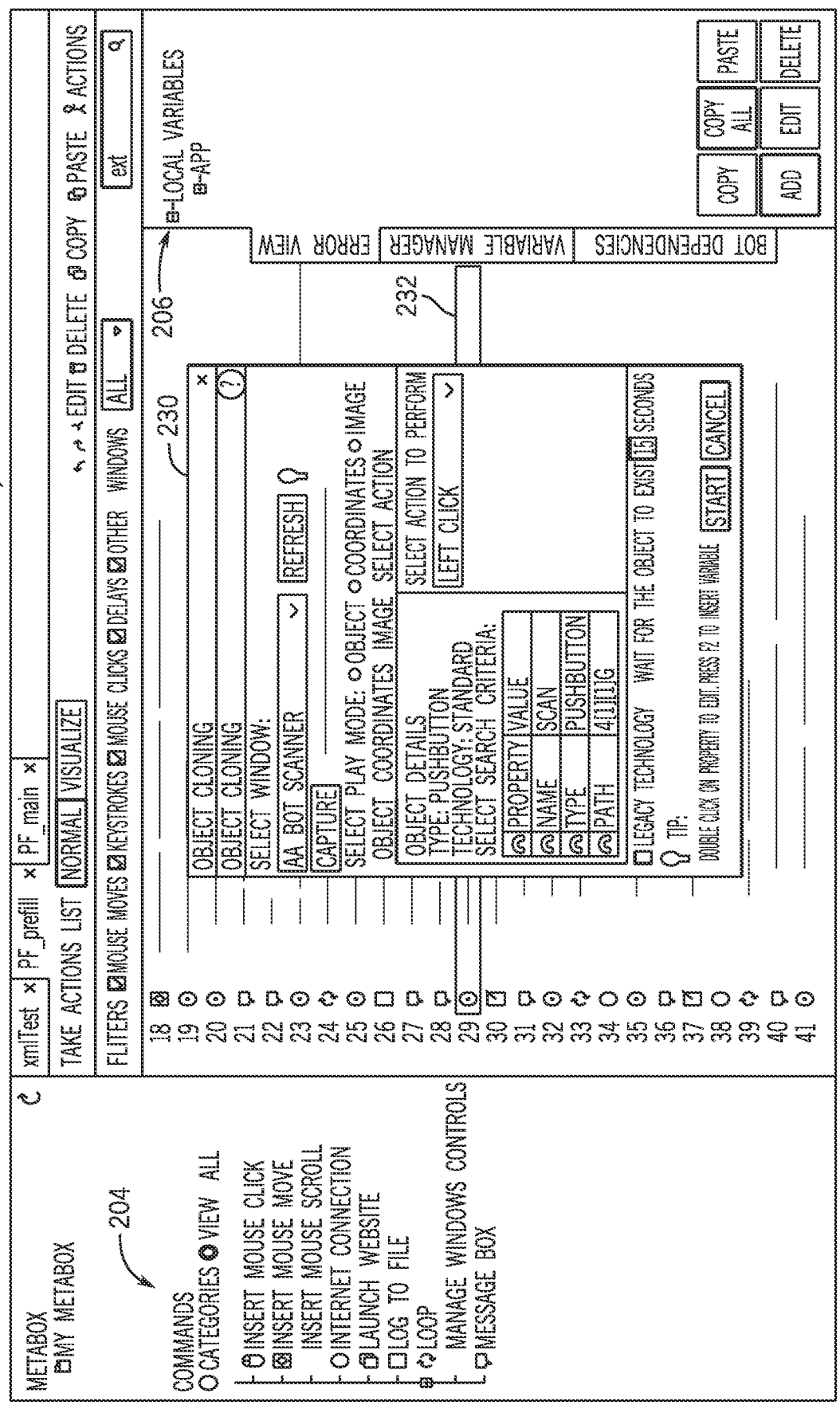
Figure 6:
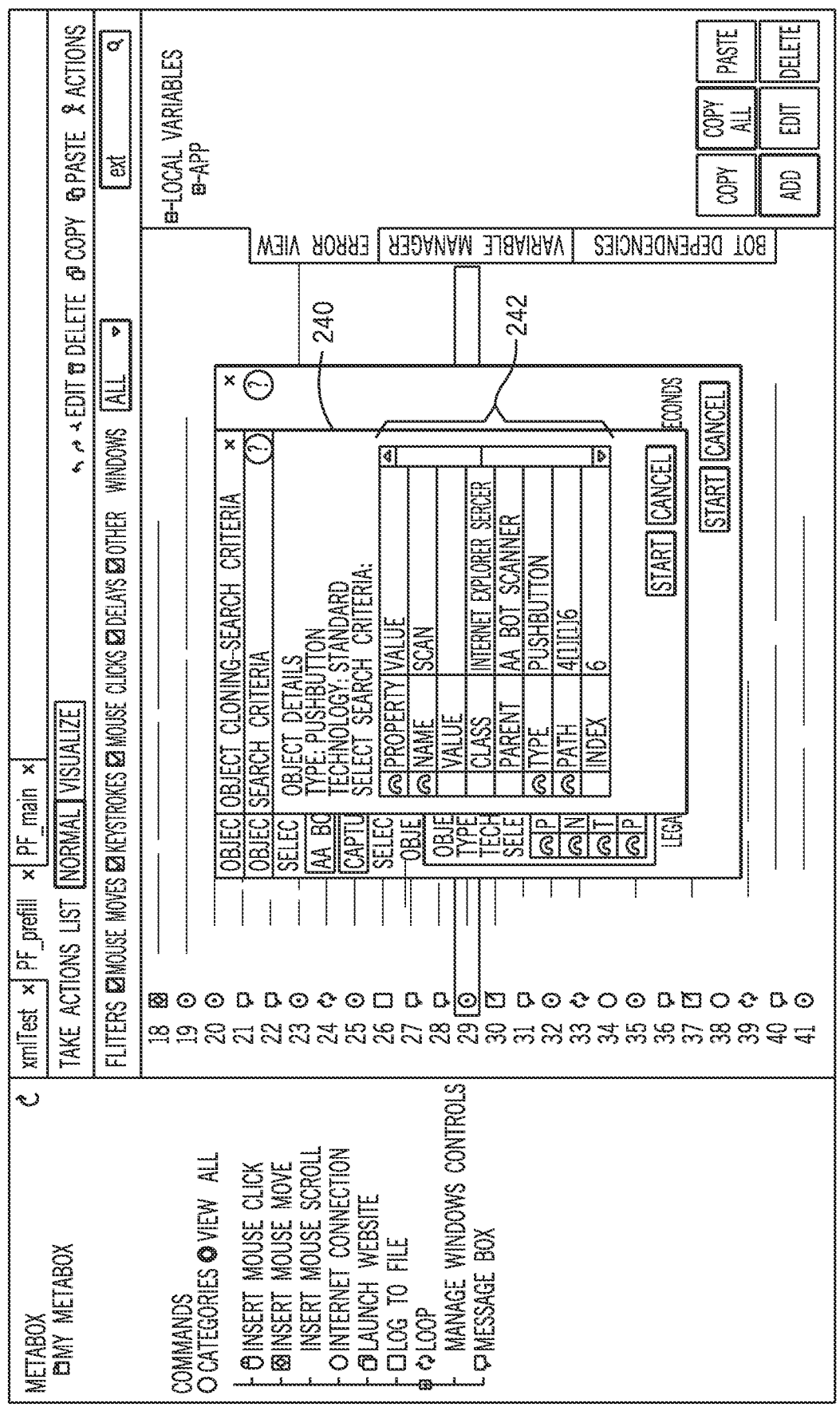

FIGS. 5-6 illustrate an exacerbated problem where multiple levels of dialog boxes are opened to review the attributes of commands. In FIG. 5, a first dialog box 230 associated with command 232 is opened, but not all of the attributes for the command 232 are present in the dialog box 230. Accordingly, an additional dialog box 240 (depicted in FIG. 6) is opened, which illustrates the attributes 242. As may be appreciated, the manual opening of dialog boxes, along with manual review may take extensive time and resources.

Figure 7:
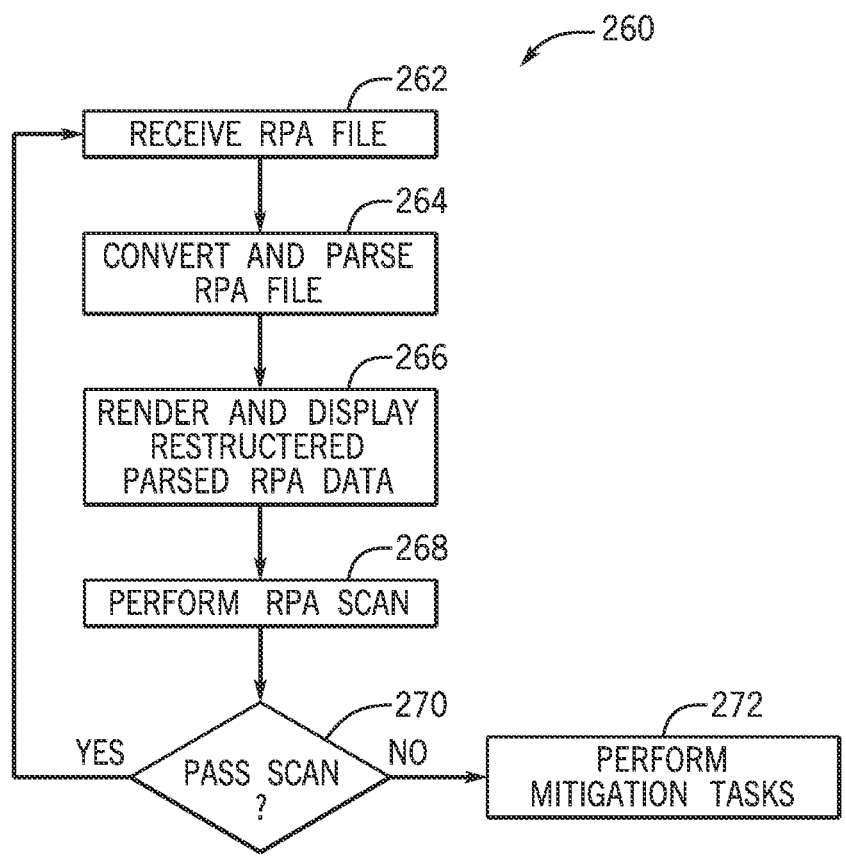
FIG. 7 is a flowchart, illustrating a process for scanning RPA files to perform mitigation tasks for RPA data that is subject to vulnerabilities and/or does not conform to code standards, in accordance with an embodiment of the current disclosure.
Figure 8:
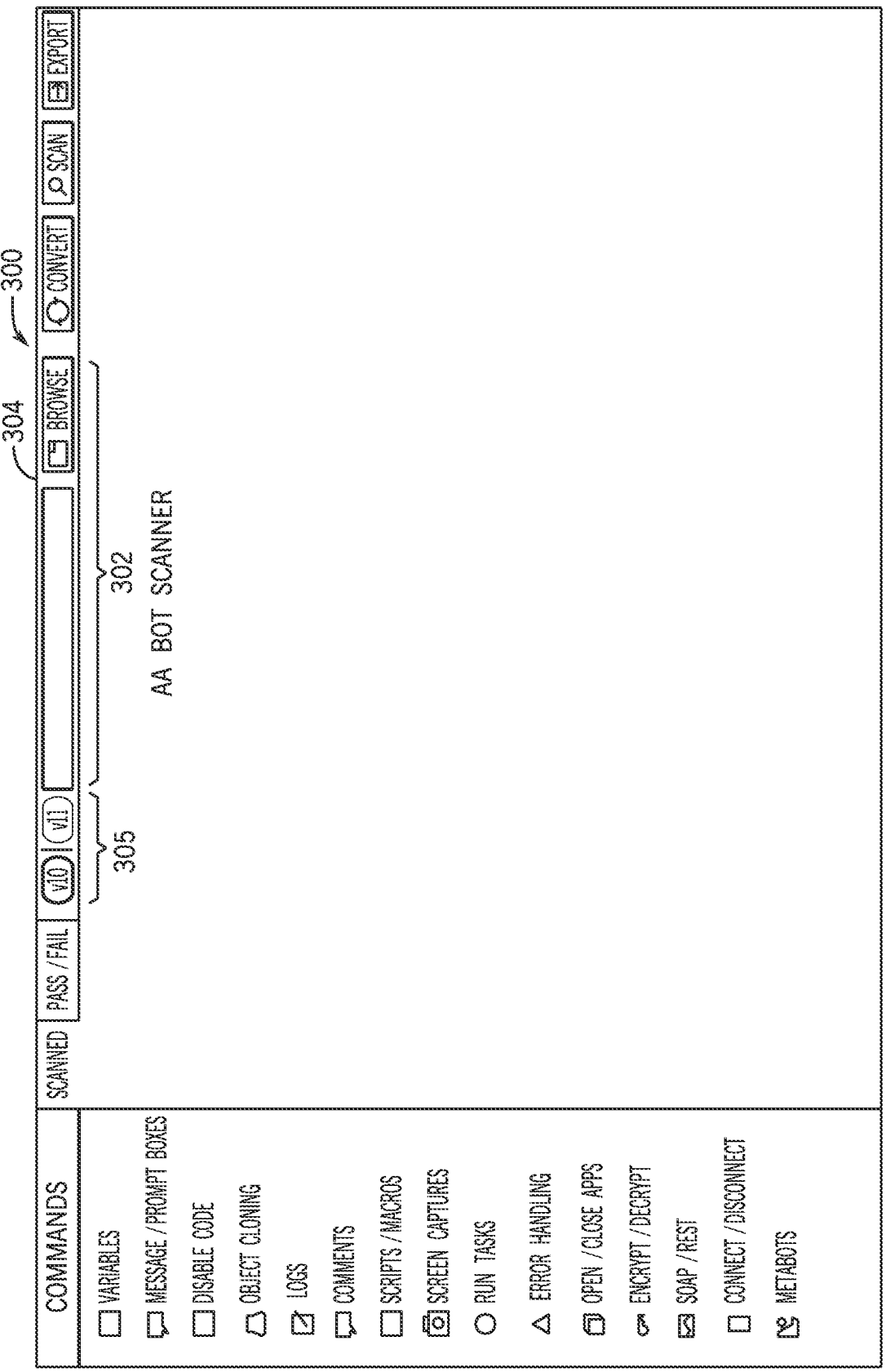

Turning now to techniques for more efficient review, FIG. 7 is a flowchart, illustrating a process 260 for scanning RPA files to perform mitigation tasks for RPA data that is subject to vulnerabilities and/or does not conform to code standards, in accordance with an embodiment of the current disclosure. The process 260 may be implemented as machine-readable and implemented tasks stored on a non-transitory, machine-readable medium.

The process 260 begins by receiving the RPA file (block 262). The RPA file may be specific to a particular RPA generation tool, such as an ATMX file that is generated from Automation Anywhere®.

Next, at block 264, when the RPA file is generation tool-specific, the RPA file may be converted to a universal format, such as XML. The universal format RPA file is parsed, identifying command/object structures of the RPA file.

Because the structure is identified through the parsing, a restructured rendering of the RPA data within the RPA file may be generated and displayed (block 266). The restructured rendering may provide the RPA data in a different display format that is specifically designed for code review. The restructured rendering may, in some instances, not be executable, but instead a representation of the executable RPA code that is specifically designed for efficient code review. For example, as will be discussed in more detail below, certain commands may be filtered out of the restructured view, as they do not have attributes for review. Further, in some embodiments, objects/commands that do have attributes for review may be displayed in command buckets, such that all objects/commands of a common type may be easily reviewed at a common time. Further, as will be discussed in more detail below, the attributes of these objects/commands may be displayed side-by-side with their corresponding objects/commands, making review simple and easy with far fewer clicks.

In some embodiments, the process 260 may continue by performing an RPA scan 268 on the restructured RPA File (block 268). As mentioned above, a code review configuration may provide a definition of particular rules that the RPA code should conform to. The code review configuration may be parsed to identify indicators of these particular rules and may scan the RPA file to determine whether these rules are conformed to. In some embodiments, each of the set of rules that are available in the code review configuration may have a unique identifier. The set of particular rules to scan against may be identified by identifying unique identifiers that are associated with an affirm indication, indicating that the rule associated with that particular unique identifier and affirm indication should be implemented.

The RPA code to scan may be a filtered subset of the data in the RPA file that is relevant to the subset of rules (e.g., unique identifiers associated with rules) that are associated with affirm indications. For example, the subset of rules may not apply to certain types of commands. Accordingly, these commands may be skipped when completing the scan.

The scan may include a search through relevant commands of the RPA file for adherence to the standard defined by the code review configuration. A number of identification techniques may be used. For example, in some embodiments, machine learning and/or text-searching may be used to identify patterns and/or words relevant to rules of the standard.

The scan may conclude whether the data within the RPA file has passed or failed the requirements of the rules of the standard. If the data within the RPA file fails to pass the rules, one or more mitigation tasks can be performed (block 272). For example, a failure report may be generated and provided to a programmer/designer/design team associated with the RPA file and/or the offending piece of the RPA file may be removed and/or prompted for removal.

Having discussed the scanning process, FIGS. 8-13 illustrate a GUI 300 of an RPA scanner that may be used to facilitate code review of RPA code, in accordance with an embodiment. Starting first with FIG. 8, the GUI 300 displays a file selection section 302, where an RPA source file may be specified. For example, here, a browse button 304 may provide a dialog box, allowing a user to indicate a particular directory or file to scan. As indicated by the version buttons 305, conversion of files generated from multiple versions of RPA file generation tools may be supported.

Figure 9:
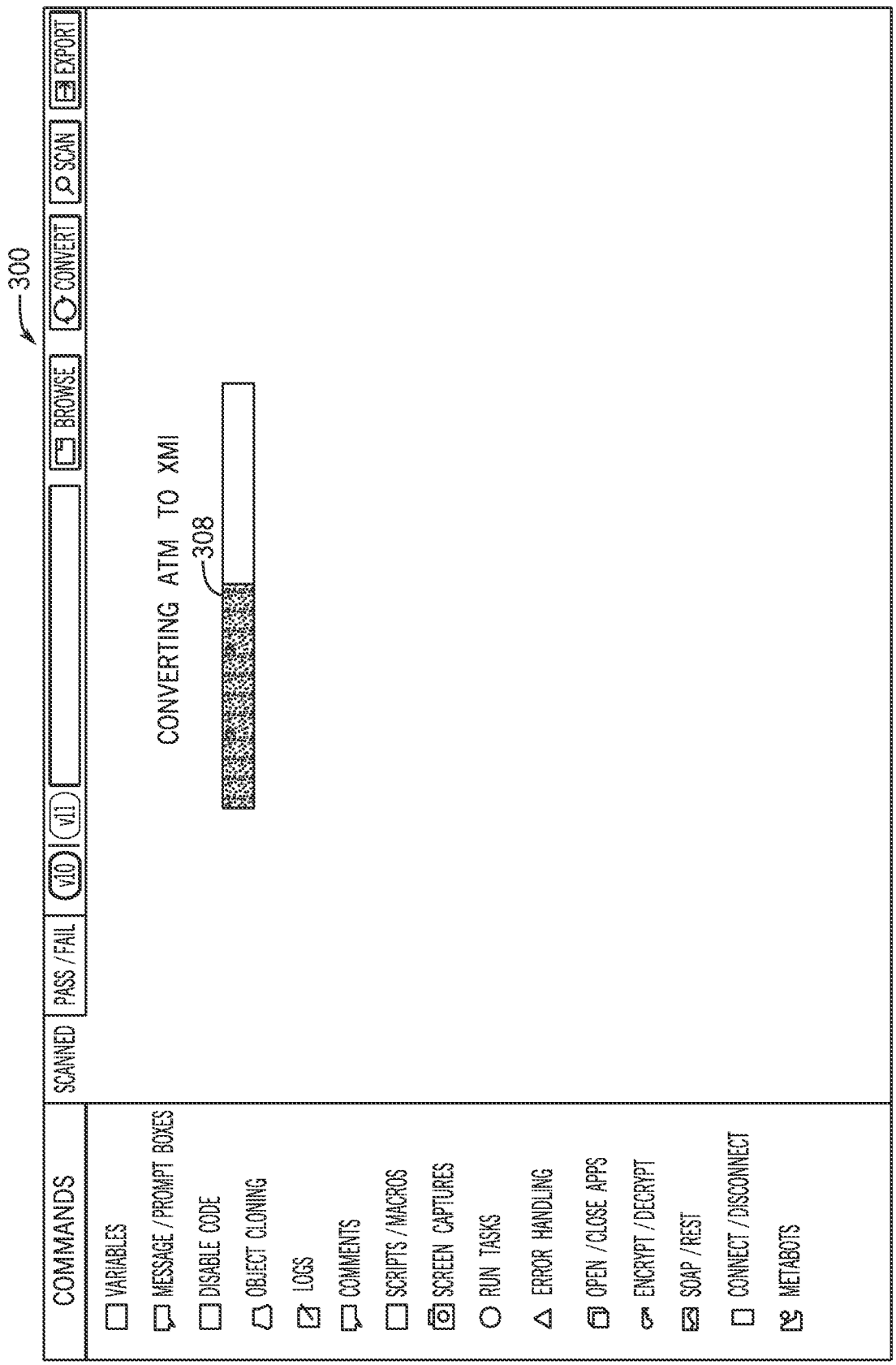

As mentioned above, once an RPA file is identified and/or received, it may be converted to a universal file. By selecting one of the buttons 305, a particular converter of a set of converters may be used to convert the file. In FIG. 9, a conversion indication 308 is provided in the GUI 300. The conversion indication may provide an indication of the type of source RPA file, the type of file that the source RPA file is being converted to, and/or a progress of the conversion. In FIG. 9, the source RPA file is an Automation Anywhere® task file (ATMX) file. The ATMX file is being converted into an XML file, as indicated by the conversion indication 308. Further, a progress bar shows the progress of the conversion.

As mentioned above, the RPA file (e.g., in the universally converted format) may be parsed and categorized by object/command type. FIG. 10 illustrates a grouped view of variables 320 that is rendered based upon selecting the variables category 322 from the commands list 323. The grouped view of variables 320 illustrates a table view 324 of variables of the RPA file and their associated values. The variables may be bundled based upon particular tasks. For example, here,
an Email Read task has a number of variables that are used and are therefore provided in a table format along with variable values. This may help code reviewers to identify variables that do not conform to standards of the organization. For example, if the variables include private information and the standard does not allow private information to be present in the RPA code, the offending variable would not conform with this requirement of the standard.

FIG. 11 illustrates a grouped view of Open/Close Apps commands 340. This may be rendered based upon selection of an Open/Close Apps option 342 from the commands list 323. As illustrated, the grouped view of Open/Close Apps commands 340 bundles tasks that open and/or close an application. For example, the Cleanuptask closes Excel and certain browser windows. In some instances, the standard may require verification that all opened actions include a subsequent closed action. Accordingly, this grouped view 340 may be beneficial in providing a quick reference for such code.

FIG. 12 illustrates a grouped view of Error Handling commands 360. This may be rendered based upon selection of an Error Handling option 362 from the commands list 323. As illustrated, the grouped view of Error Handling commands 360 provides Error Handling commands associated with tasks. For example, the Email Read task includes an Error Handling command, while the Cleanuptask does not. In some instances, the standard may require error handling for all tasks. Accordingly, this grouped view 360 may be beneficial in providing a quick reference for such code.

FIG. 13 illustrates a grouped view of Object Cloning commands 380. Object cloning is specifically used for capturing objects that use technologies such as Flex, Silverlight, Java or HTML. It captures properties such as X,Y coordinates, object properties and image, if enabled. This may be rendered based upon selection of an Object Cloning option 382 from the commands list 323. As illustrated, the grouped view of Object Cloning commands 380 provides Object Cloning commands associated with tasks. For example, HOO_ExtractionData task includes several Object Cloning commands, which are each displayed in the view 380 alongside the properties of the Object Cloning commands and values of the Object Cloning commands. This grouped view 380 may be beneficial in providing a quick reference for such code, to identify non-conformance with a standard (e.g., private information stored in properties and/or values of the Object Cloning commands).

As mentioned above, not all command types may be provided in the commands list 323. Instead, this list of commands may be pared down to include only command types that may be relevant for code review. The relevant command types may be derived based upon the standard, as defined in the code review configuration file. As illustrated in FIG. 13, some potentially relevant commands 323 may include: Command Standard Review Item

| Command | Standard Review Item |
| --- | --- |
| Variables | Checking for existence of private information, which may not be allowed by the standard. |
| Message/Prompt Boxes | The standard may define particular types of messaging/boxes that may be implemented. For example, pop-up boxes may be prohibited. Accordingly, any commands present with this command type may indicate non-compliance with such a rule. |

| Command | Standard Review Item |
|---|---|
| Disabled Code | Checking for existence of commented out code, which may cause bloating or reduced code hygiene and, thus, may not be allowed. |
| Object Cloning | Checking for existence of private information, which may not be allowed by the standard. |
| Logs | Certain logging requirements may be specified by the standard. |
| Comments | Checking for existence of private information, which may not be allowed by the standard. |
| Scripts/Macros | Checking for existence of private information, which may not be allowed by the standard. |
| Screen Captures | Some standards may not allow screen capture commands. Thus, any commands of this command type that are present in the RPA code may indicate non-compliance with such a standard. |
| Run Tasks | Checking for existence of private information, which may not be allowed by the standard. |
| Error Handling | The standard may require error handling for particular types of tasks and/or may require/restrict a particular type of error handing (e.g., no dialog boxes for error handling). |
| Open/Close Apps | The standard may require opened apps to be closed by the RPA code. |
| Encrypt/Decrypt | The standard may require particular types of data to be encrypted. |
| SOAP/REST | Checking for existence of private information, which may not be allowed by the standard. |
| Connect/Disconnect | The standard may require that connections made by the RPA code to be subsequently disconnected in the RPA code. Hardcoded credentials should not be in the code. |
| Metabots | Checking for existence of private information, which may not be allowed by the standard. |

In other embodiments, fewer or more command type views may be provided. This may be dynamically changed based upon standards defined by alternative configuration files. In some embodiments, Machine Learning or RPA tools may be used to allow the computer itself to identify the likely relevant command types based upon the particular standard rules defined in a particular configuration file. In some instances, the computer may monitor command types interacted with by human reviewers where particular standard rules are known. The interacted with command types may indicate command types that are particularly relevant to the set of rules defined by the standard. With sufficient data, having enough variation in rules of the standard, the interactions can be paired with particular reviews, enabling filtering of command types to specific standard rules defined in the configuration file.

Having discussed the scanner GUI, FIG. 14 is a diagram, illustrating an example code review report 400 that may be provided based upon the automated code review techniques described herein, in accordance with an embodiment of the current disclosure. As mentioned above, the system itself may provide an indication of pass/fail of standard rules that have been provided. For example, machine learning, text pattern searching, and/or other techniques may be used to identify particular types of data found in the commands/objects, which may help the system determine a pass/fail status of the code with regard to the defined standard rules. In some instances, the system may check for coordinated commands, such as connect and disconnect commands, open and close commands, functions and error handling, etc. When coordinated commands are not found, this may indicate non-conformity to one or more standard rules.

As illustrated, the code review report 400 may include a list of passing and/or failing rules for a given RPA file, as indicated in column 402. For example, in the current illustration, a standard rule that no private information be in the code is provided in column 402.

A pass/fail status for the rule is provided in column 404. For example, here, the no private information rule has failed.

In some instances, a remedial measure may be provided (e.g., here in column 408). In some instances, this may be provided in the form of text, video, audio, etc. In other embodiments, such as here, a link 409 may be provided to have the system automatically perform the remedial measure (e.g., here, removing private information).

Additionally, in some embodiments, a detailed reason for failure may be provided (e.g., here in column 410). Here, a specific indication that a social security number was found in command/object OBJ1. It is important to note that this information may be found by providing pattern searching and/or keyword searching for particular data. For example, a three letter—two letter—three letter combination, may be associated with a social security number. When this pattern is found, this may indicate to the system that private information is in the RPA file, which may not conform to one or more standard rules.

As mentioned above, the system may automate remedial measures. For example, FIG. 15 is a diagram, illustrating an example code modification GUI 420 that may be provided based upon the automated code review techniques described herein, in accordance with an embodiment of the current disclosure. In the depicted example, private information was found in the RPA code. The standard defines that no private information should be in the RPA code. Accordingly, in this example, the RPA file does not conform to the standard. In such a case, the system may automatically perform a remedial measure. For example, the system may remove the detected private information without input from a programmer/user. In some instances, such as here, there may be programmer/user interaction to obtain confirmation that the private information should be removed. For example, as illustrated, GUI 420 prompts a user to confirm that PI XXX-XX-XXXX should be removed from Obj1. Upon confirmation, a modified RPA file 422 is generated, removing XXX-XX-XXXX, as indicated by the dashed border 424 around XXX-XX-XXXX.

As may be appreciated, the techniques provided herein facilitate efficient code review for computer code with a complex structure. In some instances, the techniques provide computer-awareness of standard violations without reliance on human subjectivity.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:
1. A tangible, non-transitory, machine-readable medium, comprising machine-readable instructions that, when executed by one or more processors of a machine, cause the machine to:
receive a robotic process automation (RPA) file comprising an action list to perform graphical user interface

(GUI) tasks, wherein the action list derived by monitoring user performance of the GUI tasks;
parse the RPA file to accumulate RPA data comprising a command type and associated data of each action in the action list;
receive a code review configuration file comprising an indication of particular rules of a coding standard to implement;
analyze the RPA file for compliance with the coding standard, by:
identifying a subset of the command types of the RPA data that relate to the particular rules, independent of command types of the RPA data that do not relate to the particular rules;
scanning the subset of the command types of the RPA data for compliance with the particular rules based upon the command type and the associated data, by performing text pattern searching for one or more logging requirements associated with the coding standard, text pattern searching for RPA data comprising, private information, or both;
identifying non-compliance with the particular rules based upon unpermitted data being present in the associated data; and
in response to identifying the non-compliance, determining that the RPA file does not meet compliance with the particular rules; and
in response to identifying the non-compliance, display an RPA file report on a graphical user interface (GUI) that comprises one or more subsets of the RPA file that do not comply with the particular rules, and
a prompt to remove the one or more subsets of the RPA file that do not comply with the particular rules.

2. The machine-readable medium of claim 1, comprising machine-readable instructions that, when executed by the one or more processors, cause the machine to:
scan the RPA data by performing text pattern searching for RPA data comprising private information.

3. The machine-readable medium of claim 2, comprising machine-readable instructions that, when executed by the one or more processors, cause the machine to:
remove the RPA data comprising the private information prior to rendering of the RPA file report on the GUI.

4. The machine-readable medium of claim 1, wherein the RPA file report comprises a table that includes contents of the RPA file report.

5. The machine-readable medium of claim 4, wherein the table comprises the one or more subsets of the RPA file and an indication of a pass or fail for each of the one or more subsets.

6. The machine-readable medium of claim 1, comprising machine-readable instructions that, when executed by the one or more processors, cause the machine to:
perform a remedial measure for portions of the RPA data that do not comply with the particular rules.

7. The machine-readable medium of claim 6, wherein the remedial measure comprising, flagging or deleting the portions of the RPA data that do not comply with the particular rules.

8. The machine-readable medium of claim 1, comprising machine-readable instructions that, when executed by the one or more processors, cause the machine to:
support conversion from a plurality of different types of RPA files into a universal format, using one of a plurality of available conversion functions.

9. A computer-implemented method, comprising:
receiving a robotic process automation (RPA) file comprising an action list to perform graphical user interface (GUI) tasks, wherein the action list derived by monitoring user performance of the GUI tasks;
parsing the RPA file to accumulate RPA data comprising a command type and associated data of each action in the action list;
receiving a code review configuration file comprising an indication of particular rules of a coding standard to implement;
analyzing the RPA file for compliance with the coding standard, by:
identifying a subset of the command types of the RPA data that relate to the particular rules, independent of command types of the RPA data that do not relate to the particular rules;
scanning the subset of the command types of the RPA data for compliance with the particular, by performing text pattern searching for one or more logging requirements associated with the coding standard, text pattern searching for RPA data comprising, private information, or both;
identifying non-compliance with the particular rules based upon unpermitted data being present in the associated data; and
in response to identifying the non-compliance, determining that the RPA file does not meet compliance with the particular rules; and
in response to identifying the non-compliance, displaying an RPA file report on a graphical user interface (GUI) that comprises one or more subsets of the RPA file that do not comply with the particular rules.

10. The method of claim 9, comprising:
remove the RPA data comprising the private information prior to rendering of the RPA file report on the GUI.

11. The method of claim 9, wherein the RPA file report comprises one or more standard rules and an indication of whether the one or more standard rules meet the threshold compliance.

12. The method of claim 9, comprising:
performing a remedial measure for portions of the RPA data that do not comply with the particular rules, the remedial measure comprising, flagging or deleting the portions of the RPA data that do not comply with the particular rules.

13. The method of claim 9, wherein the RPA file report comprises a table that includes a pass or fail indication for each rule of the particular rules.

14. The method claim 13, wherein the table is automatically displayed on the GUI.

15. A computing system, comprising:
an electronic display;
one or more processors, configured to:
receive a robotic process automation (RPA) file comprising an action list to perform graphical user interface (GUI) tasks, wherein the action list derived by monitoring user performance of the GUI tasks;
parse the RPA file to accumulate RPA data comprising a command type and associated data of each action in the action list;
receive a code review configuration file comprising an indication of particular rules of a coding standard to implement;
analyze the RPA file for compliance with the coding standard, by:
identifying a subset of the command types of the RPA data that relate to the particular rules, independent of command types of the RPA data that do not relate to the particular rules based upon the command type and the associated data;

scanning the subset of the command types of the RPA data for compliance with the particular rules, by performing text pattern searching for one or more logging requirements associated with the coding standard, text pattern searching for RPA data comprising, private information, or both;

identifying non-compliance with the particular rules based upon unpermitted data being present in the associated data; and in response to identifying the non-compliance, determining that the RPA file does not meet a threshold compliance with the particular rules; and prompt a user to remove the one or more subsets of the RPA file that do not comply with the particular rules.

16. The computing system of claim 15, wherein the one or more processors are configured to:

generate a code review report indicating a compliance status of the one or more subsets; and cause rendering, by the electronic display, the code review report.

17. The computing system of claim 15, wherein the one or more processors are configured to:

perform a remedial measure for portions of the RPA data that do not comply with the particular rules, the remedial measure comprising, flagging or deleting the portions of the RPA data that do not comply with the particular rules.

18. The computing system of claim 15, wherein the one or more processors are configured to:

remove the RPA data comprising private information prior to rendering of the RPA file on a graphical user interface (GUI).

* * * * *